United States Patent
Ao et al.

(10) Patent No.: US 9,594,885 B2
(45) Date of Patent: Mar. 14, 2017

(54) LICENSING USING A CLOUD PUBLIC-MESSAGING INFRASTRUCTURE

(71) Applicant: MICROSOFT CORPORATION, Redmond, WA (US)

(72) Inventors: Xiang Ao, Shanghai (CN); Mingqiang Xu, Shanghai (CN); Qiufang Shi, Shanghai (CN); Gang Xue, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 14/199,685

(22) Filed: Mar. 6, 2014

(65) Prior Publication Data
US 2015/0254439 A1  Sep. 10, 2015

(51) Int. Cl.
| | | |
|---|---|---|
| *G06F 21/00* | (2013.01) | |
| *G06F 21/10* | (2013.01) | |
| *G06Q 50/18* | (2012.01) | |
| *H04L 29/08* | (2006.01) | |
| *H04L 29/06* | (2006.01) | |

(52) U.S. Cl.
CPC ............ *G06F 21/105* (2013.01); *G06F 21/10* (2013.01); *G06Q 50/184* (2013.01); *H04L 63/029* (2013.01); *H04L 67/10* (2013.01); *H04L 67/1097* (2013.01); *H04L 67/26* (2013.01)

(58) Field of Classification Search
CPC combination set(s) only.
See application file for complete search history.

(56) References Cited

U.S. PATENT DOCUMENTS

| | | |
|---|---|---|
| 8,195,938 B2 | 6/2012 | Fanton et al. |
| 8,474,027 B2 | 6/2013 | Meijer et al. |

(Continued)

OTHER PUBLICATIONS

A common API for delivering services over multi-vendor cloud resources|http://ac.els-cdn.com/S0164121213001052/1-s2.0-S0164121213001052-main.pdf?_tid=a71bdc2a-244d-11e6-8ac7-00000aacb35e&acdnat=1464382841_4ae587274612e535c084db130a774117|Silva et al.|pp. 2309-2317|2013.*

(Continued)

*Primary Examiner* — Mahfuzur Rahman
(74) *Attorney, Agent, or Firm* — Ben Tabor; Kate Drakos; Micky Minhas (57) ABSTRACT

In various embodiments, methods and systems for license-messaging using cloud public-messaging infrastructures are provided. A cloud public-messaging infrastructure supports license message communication between applications. The cloud public-messaging infrastructure may implement license-messaging that circumvents network control units that control communication to the network components. A license-messaging channel is initialized with an on-premise relay service using the cloud public-messaging infrastructure. A cloud-based relay service listens for a license request from the cloud-based application. The license request is pushed using the cloud public-messaging infrastructure such that the license request is pulled through the license-messaging channel via the on-premise relay service to the on-premise license server. A response to the license request is received at the cloud-based relay service, via the on-premise relay service using the license messaging channel, and forwarded to the cloud-based application.

20 Claims, 5 Drawing Sheets

(56) References Cited

U.S. PATENT DOCUMENTS

| | | | | |
|---|---|---|---|---|
| 2012/0072898 | A1* | 3/2012 | Pappas | G06F 21/10 717/171 |
| 2012/0192285 | A1 | 7/2012 | Heyman et al. | |
| 2012/0331528 | A1 | 12/2012 | Fu et al. | |
| 2013/0151598 | A1* | 6/2013 | Fu | H04L 67/42 709/203 |
| 2013/0326062 | A1* | 12/2013 | Ryner | H04L 67/14 709/225 |

OTHER PUBLICATIONS

Liu, et al., "SaaS Integration for Software Cloud", In IEEE 3rd International Conference on Cloud Computing, Jul. 2010, 8 Pages.
"International Search Report and Written Opinion Issued in PCT Application No. PCT/US2015/017868", Mailed Date: Jun. 29, 2015, 12 Pages.
Skonnard, "A Developer's Guide to Service Bus in Windows Azure Platform AppFabric", Software + Services on the Windows Azure platform, Nov. 2009, 48 Pages.
"System Architecture and Security of On-premise Editions (Business and Enterprise) of Pinnacle Series", Retrieved on: Sep. 10, 2013, Available at: http://www.eaglepoint.com/support/Pinnacle %20Series%20-%20Security%20and%20Privacy%20(On-premise).pdf.
"Comsol Multiphysics® Running COMSOL on the Amazon™ Cloud", Published on: Dec. 2012, Available at: http://www.comsol.com/shared/downloads/RunningCOMSOLOnTheAmazonCloud.pdf.
"Floating Licensing", Retrieved on: Sep. 10, 2013, Available at: http://www.inishtech.com/getdoc/4f2c4a2f-5684-41d3-9e96-4e42a313e78c/Floating-Licensing-Solution-Overview.aspx.
Wendt, Cris, "Floating Software Licensing 2.0—Virtual Machines & Cloud Computing", Published on: Mar. 23, 2010, Available at: http://blogs.flexerasoftware.com/ecm/2010/03/floating-software-licensing-20-virtual-machines-cloud-computing.html.
Brasseur, Vincent, "Software Licensing in the Cloud—Now With More Flexibility", Published on: Mar. 1, 2012, Available at: http://www.wired.com/insights/2012/03/licensing-cloud/.
Harrison, Erin, "Rackspace Expands Private Cloud Offering with OpenCenter", Published on: Mar. 15, 2013, Available at: http://www.softwarelicensingreport.com/articles/330677-rackspace-expands-priyate-cloud-offering-with-opencenter.htm.
"Second Written Opinion Issued in PCT Application No. PCT/US2015/017868", Mailed Date: Feb. 10, 2016, 9 Pages.
International Preliminary Report on Patentability dated Jun. 8, 2016 for International Patent Application No. PCT/US2015/017868, 10 pages.

* cited by examiner

LICENSING USING A CLOUD PUBLIC-MESSAGING INFRASTRUCTURE

BACKGROUND

Cloud computing platforms may offer building, deployment and management functionality for different types of applications and services. In this regard, existing applications may be migrated from on-premise systems to cloud computing platforms. Some cloud-based applications may be authorized for operation based on floating licenses, usually supported by on-premise license servers. Currently, conventional licensing models are not effective in supporting licensing using on-premise license servers for applications on cloud computing platforms.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for supporting license-messaging using cloud public-messaging infrastructures. A cloud public-messaging infrastructure comprises a software construct that sits between applications allowing the applications to exchange messages. The cloud public-messaging infrastructure may implement license-messaging that circumvents network control units (e.g., firewall, network address translation (NAT), and other network protocols) that control communication with network components. In one embodiment, the cloud public-messaging infrastructure further comprises a publicly accessible medium that facilitates communication between a cloud computing platform and an on-premise platform. The cloud public-messaging infrastructure may include a license-messaging channel between a cloud-based relay service and an on-premise relay service generated using Application Programming Interfaces (APIs) of the cloud public-messaging infrastructure.

In operation, the cloud-based relay service listens for a license request from the cloud-based application. Upon detecting the license request from the cloud-based application, the cloud-based relay service pushes the license request to the publicly accessible medium of the cloud public-messaging infrastructure. The on-premise relay service pulls, through the license-messaging channel, the license request. The on-premise relay service communicates the license request to the on-premise license server. The on-premise relay service receives a response to the license request from the license server. The cloud-based relay service receives the response to the license request through the license messaging channel. The response is received from the on-premise relay service using the publicly accessible medium. The cloud-based relay service forwards the response to the license request to the cloud-based application.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments of the present invention are described with reference to an on-premise platform and a cloud computing platform; in particular a service bus implementation of a cloud public-messaging infrastructure using relay services will be described. However, license-messaging using a service bus messaging infrastructure is merely exemplary and it is contemplated that the techniques described may be extended to other implementation contexts.

A cloud computing platform may span wide geographic locations, including countries and continents. The service-application components (e.g., tenant infrastructure or tenancy) of the cloud computing platform may include nodes (e.g., computing devices, processing units, or blades in a server rack) that are allocated to run one or more portions of a tenant's services and applications. When more than one application is being supported by the nodes, the nodes may be partitioned into virtual machines or physical machines. The virtual machines or physical machines run each application concurrently in individualized computing environments. The computing environments support the resources and/or operating systems specific to each application. Further, each application may be divided into functional portions such that each functional portion is able to run on a separate virtual machine or physical machine.

Traditional software licensing models have met some challenges in cloud computing platform implementations of applications that utilize licensing. Conventionally, in order for a user to get authorization to use a license, several different techniques could be used. First, a dongle solution, where a hardware token is presented during execution of the application and features of the application are licensed based on the communication with the hardware token. Second, a system fingerprinting solution, where a hardware fingerprint (e.g., CPU identification, or other hardware identifiers) are used to create a license key. And third, a network license server may issue licenses to clients on demand.

With particular reference to network license servers that facilitate floating licensing or concurrent licensing, one such implementation relates to a limited number of licenses for a software application shared among a larger number of users over time. When an authorized user runs the application, a request for a license is sent to a license server. If a license is available, the license server allows the application to run. Upon the expiration of a license period, or when the application is no longer in use, the license is reclaimed by the license server and made available to other authorized users. Licensing allows independent software vendors (ISVs) to control access to the software.

Current techniques that run a license server on-premise, at a private enterprise platform, with the application running on the cloud, in the cloud computing platform, are significantly limited. For example, the license server and a node in the cloud are typically protected by network control units. Network control units refer to hardware or software-based constructs that control communication with network components. For example, firewalls provide network security for controlling incoming and outgoing network traffic by analyzing data packets and determining whether they should be allowed through or not, based on network policies. Similarly NAT is a network protocol that provides IP address information modification while data packets are in transit across a routing device, in order to provide access to particular network components. The network control units (e.g., firewalls and NATs) impede the ability to communicate license requests between on-premise license servers and cloud-based applications requiring licenses.

A reliable service that works for all cloud computing sites is currently difficult to implement with conventional licensing methods. For example, in a NAT supported platform, an application does not have a fixed IP address to expose externally. Further, even though it is possible to open firewall ports to allow access to applications, open ports raise security concerns in addition to other issues. Also, a solution to build a VPN between the on-premise platform and the cloud computing infrastructure is complicated, in that, if applications have to reach multiple license servers in different places, multiple VPN connections may be required. Procurement and maintenance of multiple VPNs is expensive. As such, systems and methods that support cloud-based applications using on-premise license servers and account for circumventing network control units, and further accommodate multiple license servers in different locations may simplify floating licensing.

Embodiments of the present invention provide a simple and efficient method of supporting license-messaging between an on-premise license server and cloud-based applications. In particular, a cloud public-messaging infrastructure enables cloud-based applications to use license-messaging to get floating licenses from on-premise license servers. The cloud public-messaging infrastructure comprises a publicly accessible medium that facilitates communication between a cloud computing platform and an on-premise platform. Embodiments of the present invention may exclude any changes to applications or license servers, and in particular, the way applications and license servers communicate with each other to request and receive licenses. Existing licensing agreements for applications can also be executed using features of the present invention. Users may work on applications using purchased perpetual licenses. Further, the present invention may support cloud-based SaaS (software as a service) applications that utilize floating licenses, where a tenant of the SaaS service need not own cloud-ready application licenses but merely implement a license server from an on-premise platform.

The cloud public-messaging infrastructure ("messaging infrastructure") comprises a software construct that sits between applications allowing them to exchange messages. The cloud public-messaging infrastructure further comprises a publicly accessible medium that facilitates communication between a cloud computing platform and an on-premise platform. Communication through the messaging infrastructure may be through the application layer. In this regard, the cloud public-messaging infrastructure can facilitate license-messaging between an application deployed in the cloud and a license server in an on-premise private enterprise network. The messaging infrastructure may be implemented, by way of example, as a queue. A queue is a storage service for storing large number of messages. For example, a queue can be accessed from anywhere via authenticated calls using HTTP or HTTPS. In this regard, a queue may be used for license-messaging. Queues are addressable using a URL format. A set of APIs may support the implementation of a queue used for license messaging. In particular, endpoints and credentials may be configured using a storage connection string for accessing license-messaging services. Endpoints in the on-premise enterprise network and in the cloud computing platform may communicate license messages to facilitate licensing applications. A queue may be used as the messaging infrastructure for transferring messages between applications. Queues store license messages that may be read by any client (e.g., on premise or cloud-based) who has access to the storage account.

The messaging infrastructure may, in the alternative, be implemented as a service bus. A service bus connects local, firewalled on-premise servers and data with applications in the cloud without requiring the opening of any inbound ports or otherwise change firewall and router configurations. The cloud public-messaging infrastructure enables application components to securely communicate through firewalls by exchanging messages through an endpoint hosted in the cloud. An endpoint refers to an interface through which an individual instance of a service may be accessed. Application code communicates with services binding to the endpoints. Endpoints can be located behind NAT boundaries. In embodiments, relay services as clients in on-premise enterprise networks and a host in the cloud computing platform communicate for license-messaging. Other variations and combinations of messaging infrastructures of cloud public-messaging infrastructures are contemplated with embodiments of the present invention.

License-messaging using the messaging infrastructure may further be facilitated by APIs. An API library that includes specifications for routines, data structures, object classes, and variables may support the interaction between the on-premise license server and the cloud computing platform. For example, a credentialing routine may be integrated in the communications services component to support usernames and passwords via a particular messaging infrastructure (e.g., service bus or queue) for license messages. Similarly, relay service functions such as initializing a license-messaging channel, listening for request, pushing and pulling messages having data, as described in more detail herein, may be supported at both the on-premise relay service and the cloud-based relay service by APIs for communicating messages of actions taken during the license-messaging. Any other variations and combinations thereof are contemplated with embodiments of the present invention.

An exemplary embodiment of the present invention may function as a license hub using license-messaging to aggregate and relay application licenses from on-premise floating license servers to cloud-based applications. As such, it is contemplated that embodiments of the present invention may further support multiple simultaneous license-messaging channels. A plurality of floating license servers may be implemented in a plurality of different locations. Exemplary components of the present invention may further include the cloud public-messaging infrastructure comprising a publicly accessible medium, a cloud-based relay service (cloud-based relay), and a plurality of on-premise relay services (on-premise relay). An on-premise relay communicates to floating license servers and the publicly accessible medium. The cloud-based relay communicates with the publicly accessible medium and the cloud-based application. In this regard, licenses can be relayed using the license-messaging from the on-premise license server to the cloud-based application through a license-messaging channel implemented using relay services and the publicly accessible medium. It is contemplated that the connection from the relay services to the publicly accessible medium may be spontaneous, such that, outbound license-messaging from the relay services may be generated to circumvent network control units.

Accordingly, in a first aspect of the present invention, one or more computer-storage media storing computer-useable instructions that, when used by one or more computing devices, cause the one or more computing devices to perform a method for license messaging using cloud public-messaging infrastructures are provided. The method includes initializing a license-messaging channel with an on-premise relay service using a cloud public-messaging infrastructure. The cloud public-messaging infrastructure facilitates communication between an on-premise license server and a cloud-based application. The method also includes listening for a license request from the cloud-based application. The method further includes pushing the license request using the cloud public-messaging infrastructure such that the license request is pulled through the license-messaging channel to the on-premise license server. The method includes receiving a response through the cloud public-messaging infrastructure. The response is sent using the license-messaging channel. The method also includes forwarding the response to the cloud-based application.

In a second aspect of the present invention, one or more computer-storage media storing computer-useable instructions that, when used by one or more computing devices, cause the one or more computing devices to perform a method for license-messaging using cloud public-messaging infrastructures are provided. The method includes receiving through a license-messaging channel of a cloud public-messaging infrastructure, a license request for a cloud-based application. The cloud public-messaging infrastructure facilitates communication between an on-premise license server and a cloud-based application. The method also includes forwarding the license request to the on-premise license server such that a response to the license request is acquired for the cloud-based application. The method further includes communicating through the license-messaging channel the response to the license request to the cloud-based application.

In a third aspect of the present invention, a system for license-messaging using cloud public-messaging infrastructures is provided. The system includes a cloud-based component for initializing a license-messaging channel with an on-premise component using a cloud public-messaging infrastructure. The cloud public-messaging infrastructure facilitates communication between an on-premise license server and a cloud-based application. The cloud-based component is further configured for receiving a license request from the cloud-based application. The cloud-based component is further configured for pushing the license request using the cloud public-messaging infrastructure such that the license request is pulled through the license-messaging channel to the on-premise license server. The cloud-based component is also configured for receiving a response through the cloud public-messaging infrastructure. The response is sent using the license-messaging channel. The cloud-based component is further configured for forwarding the response to the cloud-based application. The system also includes the on-premise component configured for receiving through the license-messaging channel the license request for the cloud-based application. The on-premise component is further configured for forwarding the license request to the on-premise license server such that a response to the license request is acquired for the cloud-based application. The on-premise component is further configured for communicating through the license-messaging channel the response to the license request to the cloud-based application.

Figure 1:
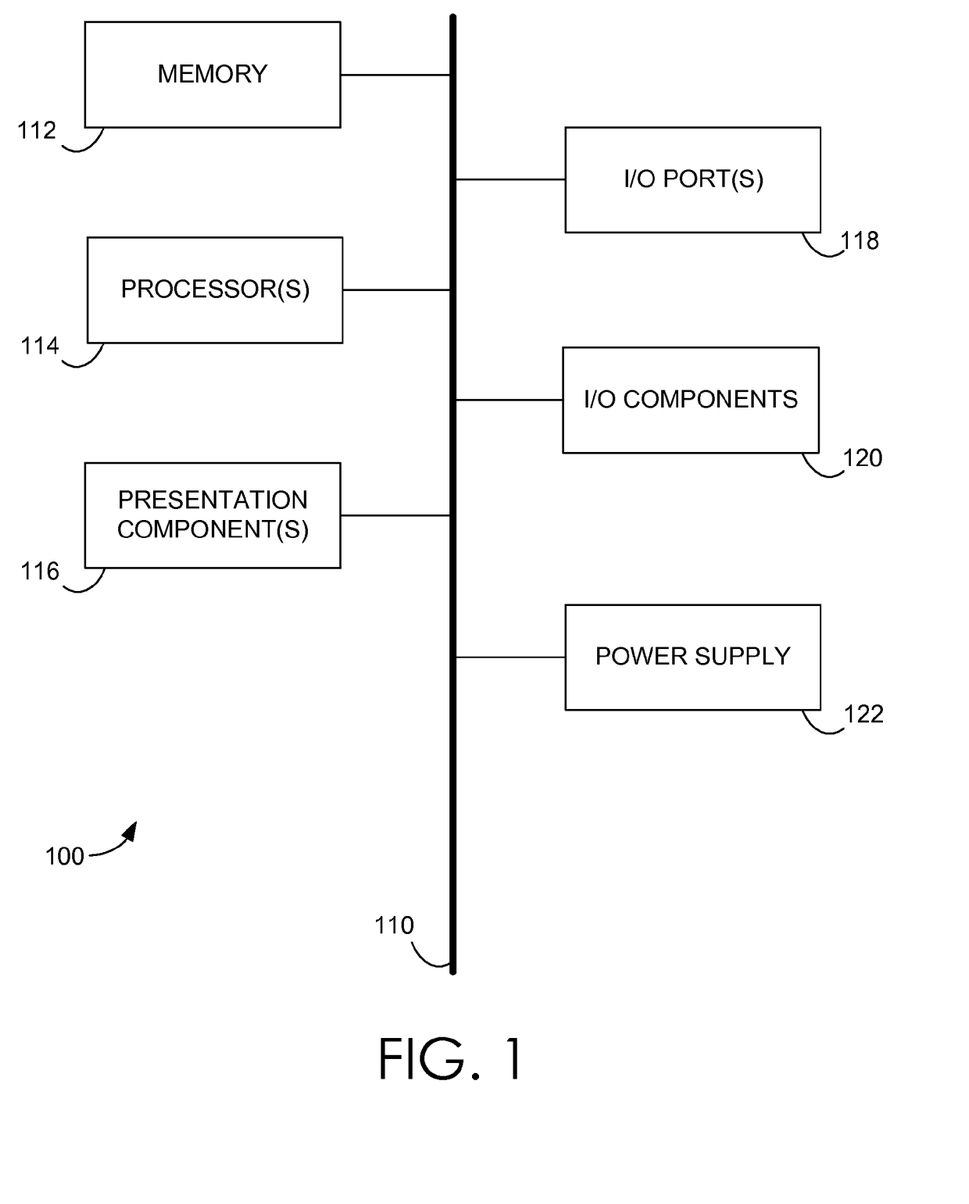
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
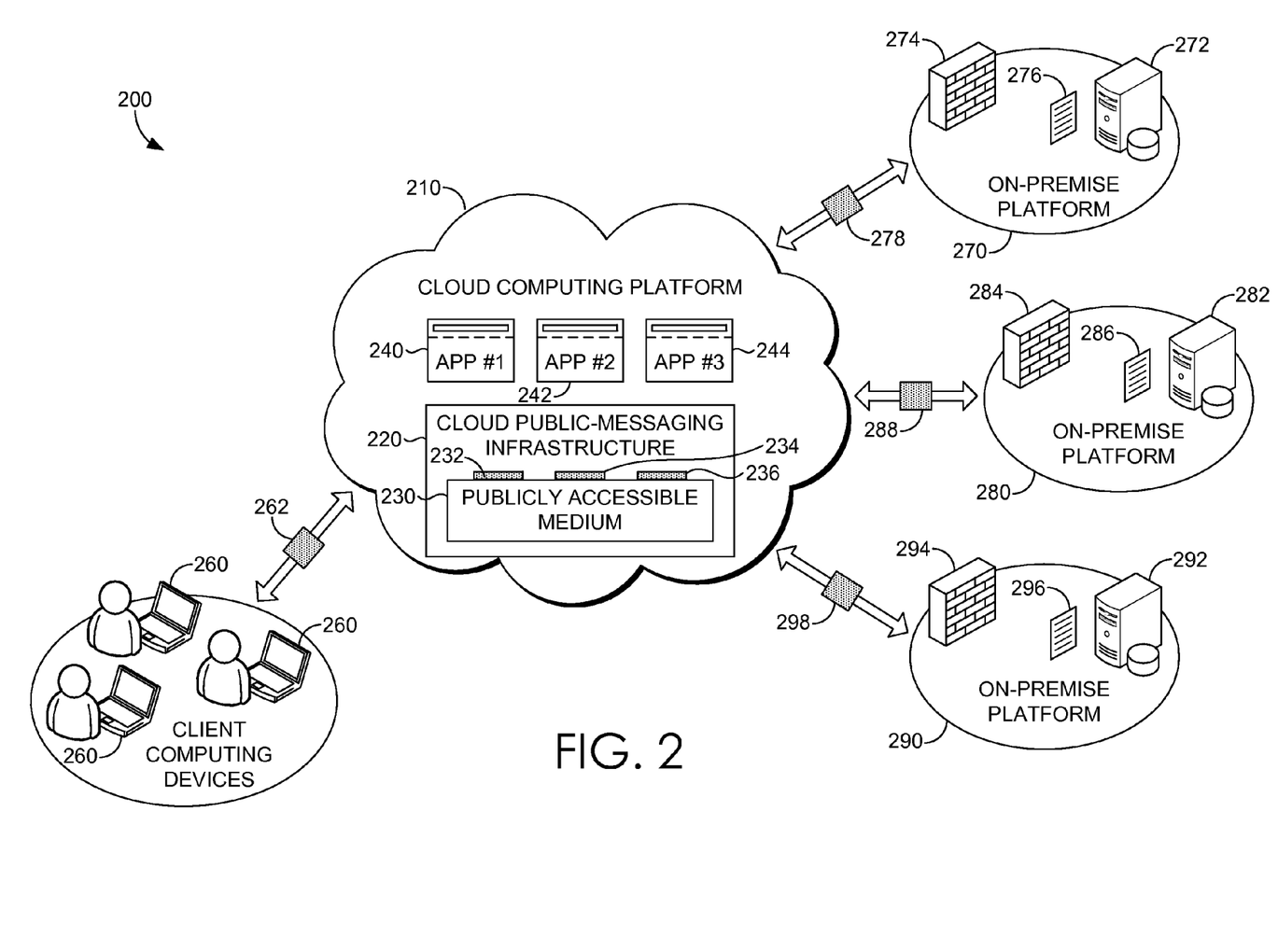
FIG. 2 is a block diagram of an exemplary network environment in which embodiments of the invention may be employed.

With additional reference to FIG. 2, a block diagram depicting an exemplary cloud-public licensing-messaging system 200 suitable for use in embodiments of the invention is described. Generally, the cloud-public licensing-messaging system 200 illustrates an environment for supporting license messaging using cloud public-messaging infrastructures. Embodiments of the present invention also provide a system and method of aggregating licenses of different applications to serve multiple deployments of different applications in the cloud computing platform based on license-messaging through a cloud public-messaging infrastructure. Among other components not shown, the cloud-public licensing-messaging system 200 generally includes a cloud computing platform 210, a cloud public-messaging infrastructure 220, applications 240, 242, 244, client computing device 260, on-premise platforms 270, 280, 290, license servers 272, 282, 292, all in communication with one another via a network (not shown).

With continued reference to FIG. 2, the network may include, without limitation, one or more local area networks (LANs) and/or wide area networks (WANs). Such networking environments are commonplace in offices, enterprise-wide computer networks, intranets and the Internet. The cloud computing platform 210 and the on-premise platforms 270, 280, 290 may each include several components (not shown) for supporting services and applications in each or both platforms. For example, components that facilitate floating licensing for a cloud-based application, the cloud-based application requires a license from an on-premise license server. Each of the systems may be linked together by the network backbone spanning to multiple on-premise platforms each supporting one or more license servers for cloud-based applications. The types of applications supported on these platforms are not intended to limit the scope of embodiments of the present invention in any way.

In some embodiments, one or more of the illustrated components/modules may be implemented as stand-alone applications. Any number of client computing devices 260, license servers 272, 282, 292, and cloud computing platforms 210, may be employed in the computing system 200 within the scope of embodiments of the present invention. Each may comprise a single device/interface or multiple devices/interfaces cooperating in a distributed environment. For instance, the cloud computing platform 210 may comprise multiple devices and/or modules arranged in a distributed environment that collectively provide the functionality of the cloud-computing platform described herein.

As used herein, the phrase "on-premise platform" is not meant to be limiting, but may encompass a number of applications and service systems on a private enterprise network that facilitate floating licensing between an on-premise license server and a cloud-based application. Additionally, other components/modules not shown also may be included within the on-premise platforms 270, 280, 290 and the cloud computing platform 210. For example, the cloud computing platform 210 is configured to allocate virtual machines within a data center for use by a service application. The cloud computing platform 210 also may be a public cloud, a private cloud, or a dedicated cloud. The cloud computing platform 210 may include a data center configured to host and support operation of endpoints in a particular service application. The phrase "application" or "service" as used herein broadly refers to any software, or portions of software, that run on top of, or accesses storage locations within, the datacenter. In one embodiment, one or more of the endpoints may represent the portions of software, component programs, or instances of roles that participate in the service application.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

A cloud computing platform (e.g., cloud computing platform 210) acts to store data or run service applications (e.g., applications 240, 242, 244) in a distributed manner. For instance, the cloud computing platform 210 functions to run one or more portions of tenants' applications. The cloud computing platform 210 includes cloud public-messaging infrastructure 220. The cloud computing platform 210 also includes applications 240, 242, 244 that may be accessed using computing devices (e.g., client computing devices 260). Client computing devices 260 may include any type of computing device, such as the computing device 100 described with reference to FIG. 1, for example. The client computing devices 260 may be used directly by users to operate applications 240, 242, 244 running on the cloud computing platform 210. It is contemplated that the client computing devices 260 trigger license-messaging 262 for obtaining a license to use a cloud-based application as described herein. For example, the client computing devices 260 may initiate a request for a license (e.g., a floating license) based on accessing a cloud-based application on the cloud computing platform 210. License messaging may, in the alternative, be triggered in the cloud computing platform, upon the client computing devices 260 accessing the applications 240, 242, 244. Any and all such variations and combinations of a client computing device accessing a cloud-based application on a cloud computing platform to trigger license-messaging, or a cloud computing platform triggering license messaging are contemplated within the scope of embodiments of the present invention.

The cloud computing platform 210 is further configured to deploy, manage, monitor and maintain several different types of components that facilitate license-messaging. For example, the cloud computing platform 210 may support the cloud public-messaging infrastructure 220, for communicating with an on-premise platform license server. In particular, the cloud public-messaging infrastructure comprises a publicly accessible medium (e.g., public accessible medium 230) that facilitates communication between a cloud computing platform and an on-premise platform. The cloud public-messaging infrastructure also functions as a license hub, using license-messaging to aggregate and relay application licenses from on-premise floating license servers to cloud-based applications. For example, the cloud-computing infrastructure as a license hub may aggregate individual licenses for each application based on license-messaging channels 232, 234, 236. It is contemplated that each license-messaging channel may correspond to a particular application. In the alternative, a license-messaging channel may exist such that each application pulls a license message from the messaging channel that corresponds to the application. As such, the license hub supports multiple simultaneous license-messaging channels with which a plurality of floating license servers may be implemented in a plurality of different locations.

The cloud public-messaging infrastructure 220 may refer to a software construct that sits between applications allowing the applications to exchange messages. In this regard, implementing the cloud public-messaging infrastructure 220 may be accomplished while excluding any changes to the cloud-based applications or on-premise license servers. For example, the applications and license servers communicate as usual while the cloud public-messaging infrastructure executes steps of the present invention to facilitate concurrent licensing. The messaging infrastructure may comprise a publicly accessible medium that allows on-premise components (e.g., license servers 272, 282, 292) to communicate via license messaging with cloud computing platform 210 components. A messaging infrastructure may circumvent network control units by communicating using the application layer.

With continued reference to FIG. 2, FIG. 2 illustrates a plurality of on-premise platforms (e.g., on-premise platforms 270, 280, 290) each having a license server (e.g., license servers 272, 282, 292). License servers 272, 282, 292 are generally configured for granting and imposing limitations on software use based on a licensing agreement. The license servers 272, 282, 292 support floating licensing based on license requests using license-messaging. License-messaging comprises messages sent from applications 240, 242, 244 as requests and responses (e.g., license messaging requests and responses 278, 288, 298) received from license servers 272, 282, 292 using the cloud public-messaging infrastructure 220. License-messaging using the cloud public-messaging infrastructure 220 may be implemented using the publicly accessible medium 230 and a routing service that establishes an outbound connection through a license-messaging channel such that the license messages are allowed to circumvent network control units (e.g., network control units 274, 284, 294). Network control units, by way of example, include firewalls and NAT protocols that would otherwise prevent communication with the license servers 272, 282, 292.

In operation, license servers 272, 282, 292 communicate responses through the cloud public-messaging infrastructure 220 in response to license requests from their corresponding applications. License requests are also communicated through the cloud public-messaging infrastructure from applications 240, 242, 244 in the cloud computing platform. The license requests may be triggered based on client computing devices 260 accessing a cloud-based application. The response may comprise a grant of a license to the requesting cloud-based application. The response may also comprise a denial of a license to the requesting cloud-based application. It is contemplated that the response may include the grant, or denial, and additional data associated with the license request. License-messaging to communicate responses may further be facilitated by a communication service (e.g., services 276, 286, 296), discussed in more detail below, implemented on the on-premise platforms. A response is based on the license server evaluating one or more license agreements for granting and limiting access to the license server supporting cloud-based applications. In embodiments, the license agreements may explicitly permit cloud-based applications to access on-premise license servers through a cloud public-messaging infrastructure. Any other variations and combination of responses, the generation thereof, and license agreements are contemplated with embodiments of the present invention.

Figure 3:
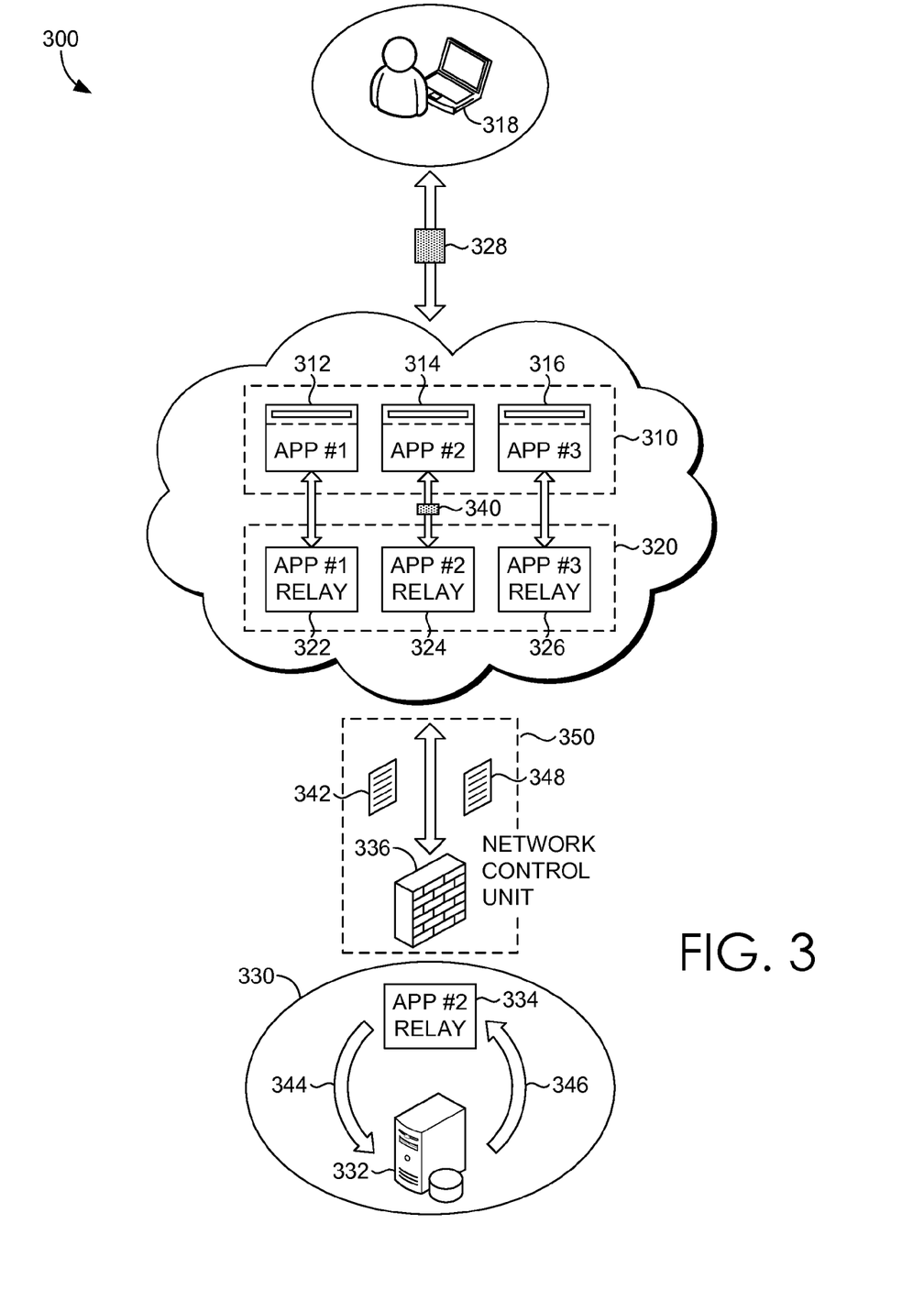
FIG. 3 is a schematic diagram showing a method for license-messaging using cloud public-messaging infrastructures, in accordance with embodiments of the present invention.

With reference to FIG. 3, an exemplary relay-based illustration of a method for license-messaging using cloud public-messaging infrastructures is provided. In particular, license-messaging may be implemented for supporting a plurality of applications 310 (e.g., applications 312, 314, 316) in conjunction with the cloud public-messaging infrastructure 320. A client computing device 318 may provide access to any or all of the applications 312, 314, 316. The cloud public-messaging infrastructure 320 comprises a software construct that sits between applications allowing the applications to exchange messages. In this regard, the cloud public-messaging infrastructure may include components in both a cloud computing platform and an on-premise platform that facilitate license-messaging. In particular, specific types of components for implementing functions of the present invention may depend on a selected cloud public-messaging infrastructure. In embodiments, the cloud public-messaging infrastructure 320 comprises a publicly accessible medium (not shown) that facilitates communication between platforms. The publicly accessible medium allows on-premise components (e.g., license servers) to communicate via license-messaging with cloud computing platform components. In addition, the cloud public-messaging infrastructure functioning as a license hub supports a plurality of license relay channels (e.g., relay channels 322, 324, 326) for cloud-based applications 310.

The cloud public-messaging infrastructure may further function as a license hub in that the messaging infrastructure generates license channels and aggregates licenses of different applications to service multiple deployments of different applications in the cloud. For example, the cloud public-messaging infrastructure 320 generates a license-messaging channel 350 for license-messaging between applications 322, 324, 326 and a license server on an on-premise platform (e.g., on-premise platform 330 and license server 332). The license-messaging channel 350 between the license server 332 and a the cloud-based application 314 supports license-messaging messages communicated through the license-messaging channel 340 while circumventing network control units (e.g., network control unit 336) associated with the an on-premise platform of the on-premise license server and a cloud-computing platform of the cloud-based application. It is contemplated that the client computing device 318 triggers license-messaging 328 for obtaining a license to use a cloud-based application by accessing one of the applications 312, 314, 316.

In an exemplary embodiment, a cloud-based relay service (e.g., app #2 relay service 324) and an on-premise relay service (e.g., app #2 relay service 334) are used in generating the license-messaging channels. Upon initializing the license-messaging channel 340, the relay service 324 may open a transmission control protocol (TCP) port 340 in the cloud to listen for requests from the cloud-based applications 310 within the cloud. The TCP port may remain active for listening for a predetermined period of time, or it may be open and closed based on a predetermined trigger. Other variations and combinations of initializing and terminating listening on the TCP port 340 are contemplated with embodiments of the present invention. It is further contemplated that a plurality of individual license-messaging channels may be configured to support corresponding applications.

Upon detecting a license request from a cloud-based application, the relay service 324 pushes the license request to cloud public-messaging infrastructure 310 (e.g., a public accessible medium). The cloud public-messaging infrastructure functions as a publicly accessible medium to facilitate communication between the cloud computing platform components and the on-premise platform components. The on-premise relay service 334 pulls from the publicly accessible medium through the license-messaging channel, the license request 342 circumventing the network control unit 336. The on-premise relay service 334 communicates 344 the license request to the license server 332. The license server 332 communicates 346 a response 348 to the license request via the on-premise relay service 334. The response 348 may comprise a grant of a license to the requesting cloud-based application. The response 348 may also comprise a denial of a license to the requesting cloud-based application. It is contemplated that the response 348 may include the grant, or denial, and additional data associated with the license request. The cloud-based relay service 324 receives the response 348 to the license request through the cloud public-messaging infrastructure 320 operating as a publicly accessible medium. The cloud-based relay service 324 then forwards the response 348 to the license request to the cloud-based application.

In another exemplary embodiment, the cloud public-messaging infrastructure may be implemented, by way of example, as a queue. A queue is a storage service for storing large number of messages. For example, a queue can be accessed from anywhere via authenticated calls using HTTP or HTTPS. In this regard, a queue may be used for license-messaging. Queues are addressable using a URL format. A set of APIs may support the implementation of a queue used for license messaging. In particular, endpoints and credentials may be configured using a storage connection string for accessing license-messaging services. Endpoints in the on-premise enterprise network and in the cloud-computing infrastructure may communicate license-messages to facilitate licensing applications. A queue may be used as the messaging infrastructure for transferring messages between applications or services. Queues store license messages that may be read by any client (e.g., on premise or cloud-based) who has access to the storage account.

Figure 4:
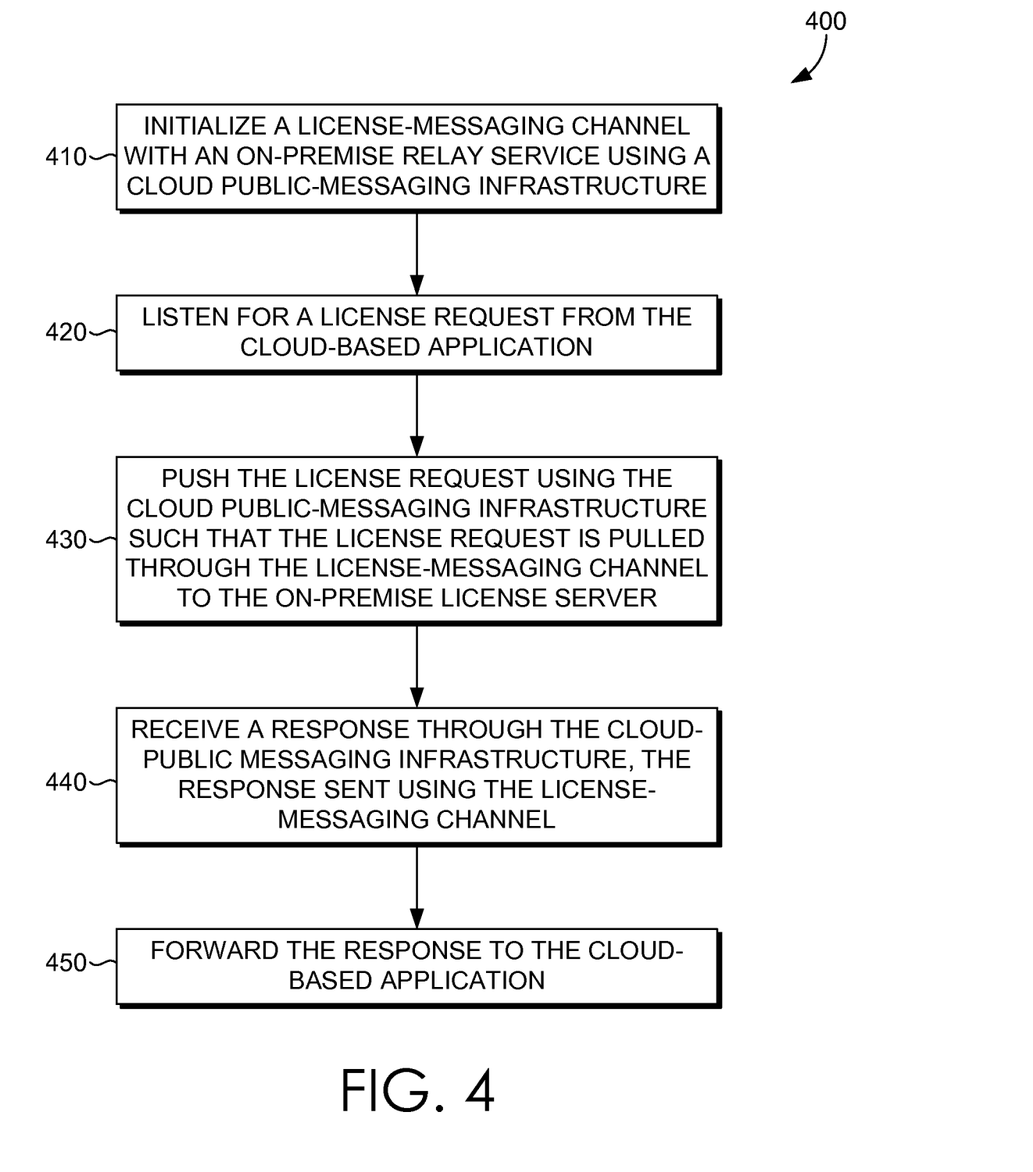
FIG. 4 is a flow diagram showing a method for license-messaging using cloud public-messaging infrastructures, in accordance with embodiments of the present invention.

Turning now to FIG. 4, a flow diagram is provided that illustrates a method 400 for license-messaging using cloud public-messaging infrastructures. At block 410, a license-messaging channel with an on-premise relay service is initialized. The license messaging channel is initialized using a cloud public-messaging infrastructure. The cloud public-messaging infrastructure comprising the license-messaging channel facilitates communication between an on-premise license server and a cloud-based application. At block 420, a license request, from the cloud-based application, is listened for. The license request is listened for through a TCP port and opened for communication between the application and the cloud-pubic messaging infrastructure. At block 430, the license request is pushed, using the cloud public-messaging infrastructure, such that the license request is pulled through the license-messaging channel to the on-premise license server. The cloud public-messaging infrastructure comprises a publicly accessible medium for facilitating communication with the on-premise license server. At block 440, a response is received through the cloud public-messaging infrastructure. The response is sent using the license-messaging channel. At block 450, the response is forwarded to the cloud-based application.

Figure 5:
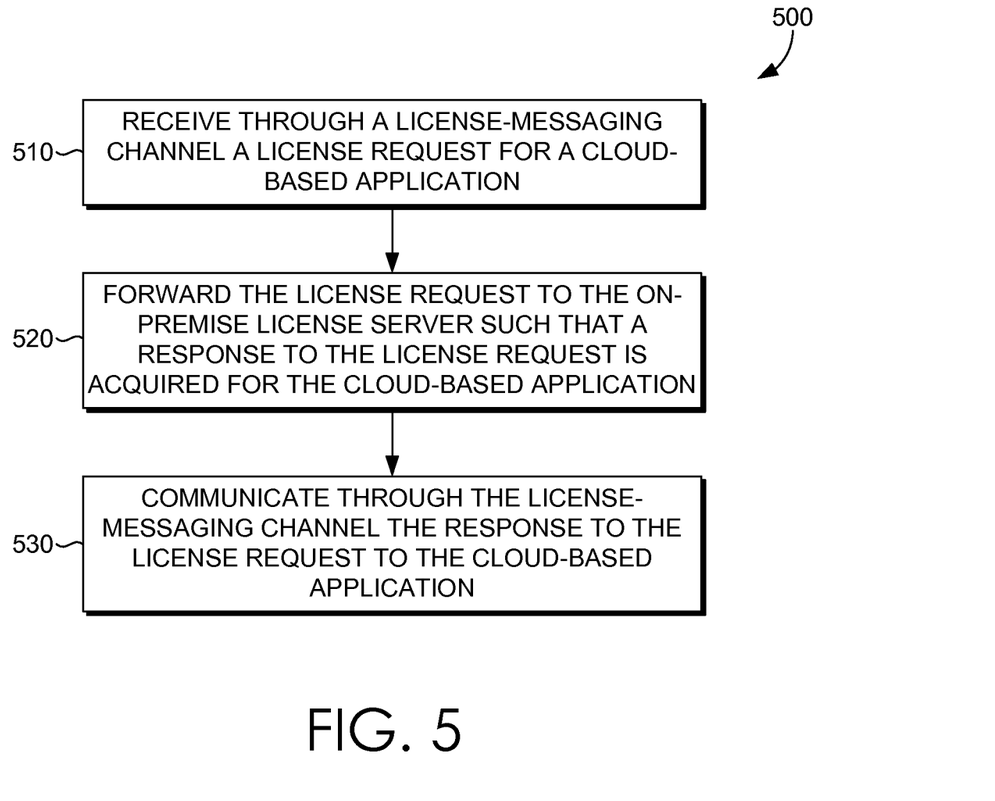
FIG. 5 is a flow diagram showing a method for license-messaging using cloud public-messaging infrastructures, in accordance with embodiments of the present invention.

Turning now to FIG. 5, a flow diagram is provided that illustrates a method 500 for license-messaging using cloud public-messaging infrastructures. At block 510, a license request for a cloud-based application is received through a license-messaging channel. The license-messaging channel facilitates communication between an on-premise license server and a cloud-based application using a cloud public-messaging infrastructure. At block 520, the license request is forwarded to the on-premise license server such that a response to the license request is acquired for the cloud-based application. At block 530, the response to the license request is communicated to the cloud-based application through the license-messaging channel.

From the foregoing, it will be seen that this invention is one well adapted to attain all the ends and objects hereinabove set forth together with other advantages obvious and inherent to the structure. It will be understood that certain features and sub-combinations are of utility and may be employed without reference to other features or sub-combinations. This is contemplated by and is within the scope of the claims.

The invention claimed is:

1. A computer-implemented method suitable for use in a distributed computing environment utilizing a processor and a memory for implementing license-messaging using cloud public-messaging infrastructures, the method comprising:
    initializing a license-messaging channel with an on-premise relay service using a cloud public-messaging infrastructure,
    wherein the cloud public-messaging infrastructure facilitates communication between an on-premise license server and a cloud-based application based on a publicly accessible medium of the cloud public-messaging infrastructure,
    the publicly accessible medium is between the on-premise relay service and a cloud-based relay service for communicating license messages,
    wherein the cloud public-messaging infrastructure comprises a queue that stores license messages or a service bus that binds corresponding client-host Application Programming Interfaces (API) implemented at an on-premise relay service and a cloud-relay service respectively,
    wherein the queue or the service bus operates with outbound connections to the publicly accessible medium such that license-messaging circumvents network control units;
    listening for a license request from the cloud-based application;
    pushing the license request to the publicly accessible medium of the cloud public-messaging infrastructure such that the license request is pulled through the license-messaging channel to the on-premise license server;
    receiving a response through the cloud public-messaging infrastructure, the response sent using the license-messaging channel and an outbound connection from the on-premise relay service to the publicly accessible medium, the outbound connection from the on-premise relay service circumvents network control unit boundaries; and
    forwarding the response to the cloud-based application.

2. The method of claim 1, wherein upon initializing a license-messaging channel, opening a Transmission Control Protocol (TCP) port in the cloud to listen for requests from the cloud-based application within the cloud.

3. The method of claim 1, wherein the queue is configured with endpoints and credentials for accessing license-messaging services.

4. The method of claim 1, wherein implementing the cloud-public infrastructure of license-messaging excludes modification of the on-premise license server and the cloud-based application.

5. The method of claim 1, wherein binding is facilitated by endpoints located behind network address translation (NAT) boundaries.

6. The method of claim 5, wherein the endpoints are implemented using dynamically assigned IP addresses.

7. The method of claim 1, wherein the service bus supports outbound connections to the publicly accessible medium without having to open any inbound ports.

8. The method of claim 1, further comprising aggregating a plurality of licenses in a license hub, wherein the license hub comprises a plurality of license-messaging channels for a plurality of corresponding on-premise license servers and cloud-based applications.

9. The method of claim 1, wherein the license hub supports the plurality of licenses for different types of cloud-based applications in one or more deployments and the plurality of on-premise servers for different geographic locations.

10. One or more computer-storage media hardware storing computer-useable instructions that, when used by one or more computing devices, cause the one or more computing devices to perform a method for license-messaging using cloud public-messaging infrastructures, the method comprising:
    pulling from a publicly accessible medium through a license-messaging channel of a cloud public-messaging infrastructure, a license request for a cloud-based application,
    wherein the cloud public-messaging infrastructure facilitates communication between an on-premise license server and a cloud-based application based on a publicly accessible medium of the cloud public-messaging infrastructure,
    the publicly accessible medium is between an on-premise relay service and a cloud-based relay service for communicating license messages, wherein the cloud public-messaging infrastructure comprises a queue that stores license message or a service bus that binds corresponding client-host Application Programming Interfaces (API) implemented at an on-premise relay service and a cloud-relay service respectively,
    wherein the queue or the service bus operates such that license-messaging circumvents network control units;
    forwarding the license request to the on-premise license server such that a response to the license request is acquired for the cloud-based application; and
    communicating through the license-messaging channel the response to the license request to the cloud-based application, the response is communicated using the license-messaging channel and an outbound connection from the on-premise relay service to the publicly accessible medium, the outbound connection from the on-premise relay service circumvents network control unit boundaries.

11. The media of claim 10, wherein the queue is configured with endpoints and credentials for accessing license-messaging services.

12. The media of claim 10, wherein the publicly accessible medium is between the on-premise relay service having a communications client and a cloud-based relay service having a communications host.

13. The media of claim 10, wherein the service bus supports outbound connections to the publicly accessible medium without having to open any inbound ports.

14. The media of claim 10, wherein the response to the license request is based on a license agreement for the cloud-based application that determines granting and imposing licensing limitations.

15. A system for license-messaging using cloud public-messaging infrastructures:
a processor and a memory configured for providing computer program instructions to the processor;
a cloud-based component configured for:
initializing a license-messaging channel with an on-premise component using a cloud public-messaging infrastructure, wherein the cloud public-messaging infrastructure facilitates communication between an on-premise license server and a cloud-based application based on a publicly accessible medium of the cloud public-messaging infrastructure, the publicly accessible medium is between an on-premise relay service and a cloud-based relay service for communicating license messages,
wherein the cloud public-messaging infrastructure comprises a queue that stores license messages or a service bus that binds corresponding client-host Application Programming Interfaces (API) implemented at an on-premise relay service and a cloud-relay service respectively,
wherein the queue or the service bus operates with outbound connections to the publicly accessible medium such that license-messaging circumvents network control units;
receiving a license request from the cloud-based application;
pushing the license request using the cloud public-messaging infrastructure such that the license request is pulled through the license-messaging channel to the on-premise license server;
receiving, a response through the cloud public-messaging infrastructure, the response sent using the license-messaging channel and an outbound connection from the on-premise relay service to the publicly accessible medium, the outbound connection from the on-premise relay service circumvents network control unit boundaries; and
forwarding the response to the cloud-based application;
the on-premise component configured for:
pulling from the publicly accessible medium through the license-messaging channel the license request for the cloud-based application;
forwarding the license request to the on-premise license server such that a response to the license request is acquired for the cloud-based application; and
communicating through the license-messaging channel the response to the license request to the cloud-based application, the response is communicated using the license-messaging channel and the outbound connection from the on-premise relay service to the publicly accessible medium, the outbound connection from the on-premise relay service circumvents network control unit boundaries.

16. The media of claim 15, wherein the service bus supports outbound connections to the publicly accessible medium without having to open any inbound ports.

17. The system of claim 15, wherein binding is facilitated by endpoints located behind network control units.

18. The system of claim 15, wherein the queue supports a storage account for license-messaging using Application Programming Interfaces (APIs) implementing authenticated calls to the storage account using Hypertext Transfer Protocol (HTTP).

19. The system of claim 15, further comprising a license hub configured for aggregating a plurality of licenses, wherein the license hub comprises a plurality of license-messaging channels for a plurality of corresponding on-premise license servers and cloud-based applications.

20. The system of claim 15, wherein implementing the cloud-public infrastructure for license-messaging excludes modification of the on-premise license server and the cloud-based application.

* * * * *